United States Patent [19]

Ahlen

[11] 4,058,980
[45] Nov. 22, 1977

[54] HEAT EXCHANGERS

[75] Inventor: Karl Gustav Ahlen, Stockholm, Sweden

[73] Assignee: S.R.M. Hydromekanik Aktiebolag, Stockholm-Vallingby, Sweden

[21] Appl. No.: 705,899

[22] Filed: July 16, 1976

Related U.S. Application Data

[63] Continuation-in-part of Ser. No. 549,359, Feb. 12, 1975, abandoned.

[30] Foreign Application Priority Data

Dec. 18, 1974 United Kingdom ............... 54771/74

[51] Int. Cl.² .......................... F16D 33/00; F28D 7/02
[52] U.S. Cl. ...................................... 60/337; 165/165; 165/166
[58] Field of Search .................. 60/329, 337; 165/165, 165/166

[56] References Cited

U.S. PATENT DOCUMENTS

| | | | |
|---|---|---|---|
| 2,181,230 | 11/1939 | Groat | 165/70 |
| 2,193,405 | 3/1940 | Goodman | 165/70 |
| 2,348,020 | 5/1944 | Morris | 165/167 |
| 2,392,444 | 1/1946 | Amand et al. | 165/157 X |
| 2,582,871 | 1/1952 | Kimtner | 165/167 X |
| 2,617,634 | 11/1952 | Jendrassik | 165/167 X |
| 2,782,008 | 2/1957 | Caughill | 165/166 X |
| 3,591,966 | 7/1971 | Kell | 60/337 |
| 3,703,925 | 11/1972 | Ireland et al. | 165/165 X |
| 3,865,185 | 2/1975 | Ostbo | 165/165 |

FOREIGN PATENT DOCUMENTS 534,313  3/1941  United Kingdom ................. 165/167

Primary Examiner—Edgar W. Geoghegan
Attorney, Agent, or Firm—Larson, Taylor and Hinds

[57] ABSTRACT

A heat exchanger especially adapted for use in combination with a transmission such as a hydraulic torque converter. A plurality of generally flat cooling cells are stacked upon each other, each cell including a pair of plates sealed together about their outer periphery and forming therebetween a fluid flow space. Each cell includes a separate inlet opening and outlet opening passing completely therethrough in a direction perpendicular to the direction of stacking. In the stack, all of the inlet holes communicate with each other to form the inlet while all of the outlet holes communicate with each other to form the outlet. A sealing device encircles each opening in each space between the cells. The sealing means can include a pair of concentric rings between which an opening can be provided through the cells without communicating with the interior thereof, for draining leaking fluid to atmosphere. The individual cells are of the same shape so that any selected number thereof can be utilized depending on the desired capacity of the heat exchanger. Within the cells, a spacing structure surrounding each opening spaces the plates apart providing both a space for fluid flow therepast between the opening and the cell interior and a leakage flow path therethrough which does not communicate with the cell interior. The spacing structure may be a separate member. Alternatively, in one arrangement wherein the cells are formed only by two plates appropriately stamped out and mated together, the stamping can include shaping to form the spacing structure.

27 Claims, 9 Drawing Figures

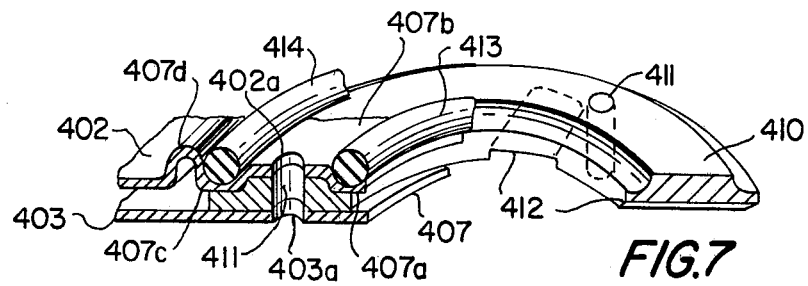
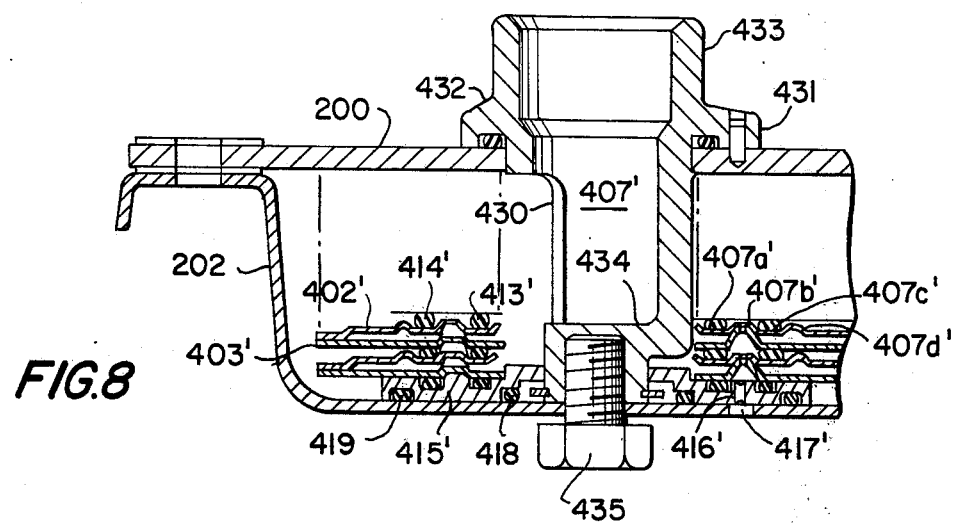
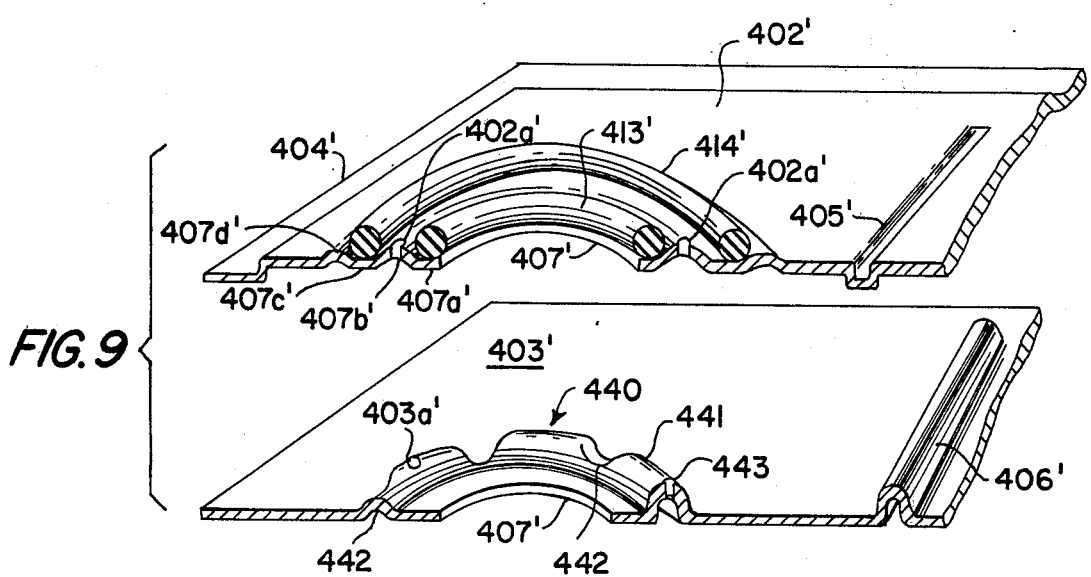

HEAT EXCHANGERS

RELATED APPLICATION

This application is a continuation-in-part of my co-pending application Ser. No. 549,359, filed Feb. 12, 1975, now abandoned.

This invention relates to heat exchangers and especially to heat exchangers for use with hydrodynamic torque converter transmissions. The invention particularly relates to heat exchangers in hydrodynamic torque converter transmissions where it is possible to use the torque converter blade system as a retarder, where extremely high cooling capacity is necessary and where, at the same time, it is important that the heat exchanger should be of relatively small size or of suitable form as well as possessing relatively low pressure drops for both the fluid to be cooled and the cooling fluid.

Torque converter transmissions utilizing the blade system of the torque converter as a retarder are well known. One such type with especially high braking capacity is the so-called SRM DS torque converter as developed by the present Applicant.

It is not especially difficult to cool the working fluid of the torque converter sufficiently enough to maintain a desired temperature in normal driving even in the case of such transmissions used for locomotives, heavy trucks or even buses. Standard heat exchangers mounted on the transmissions can be used and have been used. When, however, the blade system is utilized as a retarder and especially when the arrangement of the torque converter is such that the guide blades rotate backwards in relation to the turbine blades to transform energy fed into the torque converter from its normal output shaft, the requirement for cooling capacity is multiplied several times. The heat exchanger must be able to transfer enough calories per second from the oil, which is the working fluid of the torque converter, to the fluid which is the cooling medium for the cooler, to keep an acceptable temperature even when running at a balanced speed on long downhill gradients. For example, a 40 ton truck moving at 80 km/h in top speed when running downhill along a 6% gradient must be able to remove heat from the torque converter at the rate of about 250 hp, that is it must remove the same amount as the total energy of the engine driving the truck, while 20% (i.e. 1/5) of the cooling capacity is sufficient when hydraulic braking is not used.

With present day oils high oil temperatures are allowable, but still there is a relatively small quantity of circulating oil available, and further, the oil circulation system must have a limited pressure drop. Thus, a high pressure drop through the heat exchanger on the oil side cannot be allowed. On the cooling water side the heat exchanger is normally connected in series with the engine in the engine cooling system. As the engine does not need to be cooled at the same time as cooling for braking is required, and further, since during driving only a small percentage of the input power to the transmission has to be removed by cooling under the conditions when the engine requires maximum cooling, thus when using hydraulic braking, the normal cooling system of the engine is of sufficient capacity.

The only requirements are that the extra pressure drop on the water side has to be limited so that it does not influence the water circulation quantity to any high degree. Some extra pressure drop is always possible in practice without reducing the cooling fluid circulation, due to the characteristic of the central pump.

A heat exchanger suitable for use with a hydrodynamic torque converter transmission, where the torque converter is used as a retarder, must have many features, as described above, which are not normally required in a standard heat exchanger.

It is an object of this invention to provide a structure of heat exchanger, which, better than known structures, utilizes the particular circumstances under which a heat exchanger for the above purpose shall work, that is, to obtain within a suitable volume and desired shape of the heat exchanger, maximum cooling capacity while at the same time the total pressure drop, both on the oil side and on the water side, including pipes, is substantially reduced. Finally it is desirable to vary the capacity obtainable within acceptable dimensions to allow the use of hydrodynamic braking of the type described or to allow for transmissions without hydraulic braking.

A further object of the invention is to provide a structure which is less sensitive than normal heat exchangers to very rapid changes in temperatures, and also in case of leakage to cause the leakage from both sides, the oil and the cooling medium to leak directly to atmosphere and not from one medium to the other, which is very important for the kind of use referred to.

It is yet a further object of the invention to provide a heat exchanger which not only reduces the pressure drop through the heat exchanger for the same cooling capacity and the quantity of fluid circulated, as mentioned previously, but also avoids the use of external piping for leading the fluid to and from the heat exchanger.

According to the present invention there is provided a heat exchanger suitable for transferring heat from the working fluid in a torque converter transmission to a cooling liquid of an engine cooling system. The heat exchanger includes a plurality of heat exchange cells, each cell having an inflow opening and an outflow opening and comprising two metal plates sealed to each other around their circumferential boundaries and over limited regions within their boundaries to produce channels for the flow of fluid between the plates. A sealing unit sealingly is disposed between the plates of each cell to encircle the inflow and outflow openings. Within the cells a spacing structure surrounding each opening spaces the plates apart providing a space for fluid flow therepast between the openings and the cell interiors, and said spacing structure also provides a leakage flowpath therethrough which does not communicate with the cell interior. The spacing structure may be in the form of a separate member; or alternatively the cells may be formed solely of two stamped plates wherein the shape of the stamped plates are such as to form the spacing structure.

The two sheets of each cell are preferably sealed to each other by welding in short distances. The cooling fluid conveniently passes between adjacent cells stacked in a bank with the adjacent cells interconnected to each other with sealing elements formed in such a way that the cooling fluid and the fluid to be cooled are sealed with respect to the surrounding air and to each other, and the bank or assembly of elements is enclosed in a container.

One of the features of this heat exchanger for the purpose in question is that it can be used as an integer of the torque converter transmission and may, for instance, form the oil reservoir for the converter and a part of the stationary casing of the transmission. Thus, the connection pipes to the feeder fluid system of the torque converter can advantageously be placed within the casing. Indeed, with the heat exchanger of the type in question all outside pipes for pressure oil can be avoided. At the same time the number of connection pipes are reduced to a minimum and their internal diameters may be made relatively large so as to reduce oil pressure losses in the connection pipe system.

A further feature of the heat exchanger according to the invention is that standardization of the plate heat exchange cells allows the heat exchanger to be adapted for different applications using an appropriate number of the cells.

Further, it is possible to readily achieve the pressure drop and heat transfer required within the temperature and oil quantity limitations existing in the torque converter.

Torque converters of the type in question normally operate at fairly high temperatures and the viscosity of the oil at these high temperatures is usually relatively low. The heat exchange cells can be manufactured with suitable hydraulic channel diameters and also so as to permit suitable arrangements to be made to break the boundary layer on the oil side to obtain high efficiency. Furthermore, this is achieved without incurring high pressure drop losses.

The invention will now be described by way of example with reference to the accompanying drawings, in which:

FIG. 7 is an enlarged perspective cross-sectional view of a portion of FIG. 6 with certain elements cut away for clarity.

FIG. 8 is an enlarged cross-sectional view corresponding to a portion of FIG. 2 but showing another embodiment of the invention.

FIG. 9 is an enlarged view of certain portions of FIG. 8 with the elements shown in section with the remaining portions shown in perspective, the illustrated elements being separated and shown in an exploded view.

Figure 1:
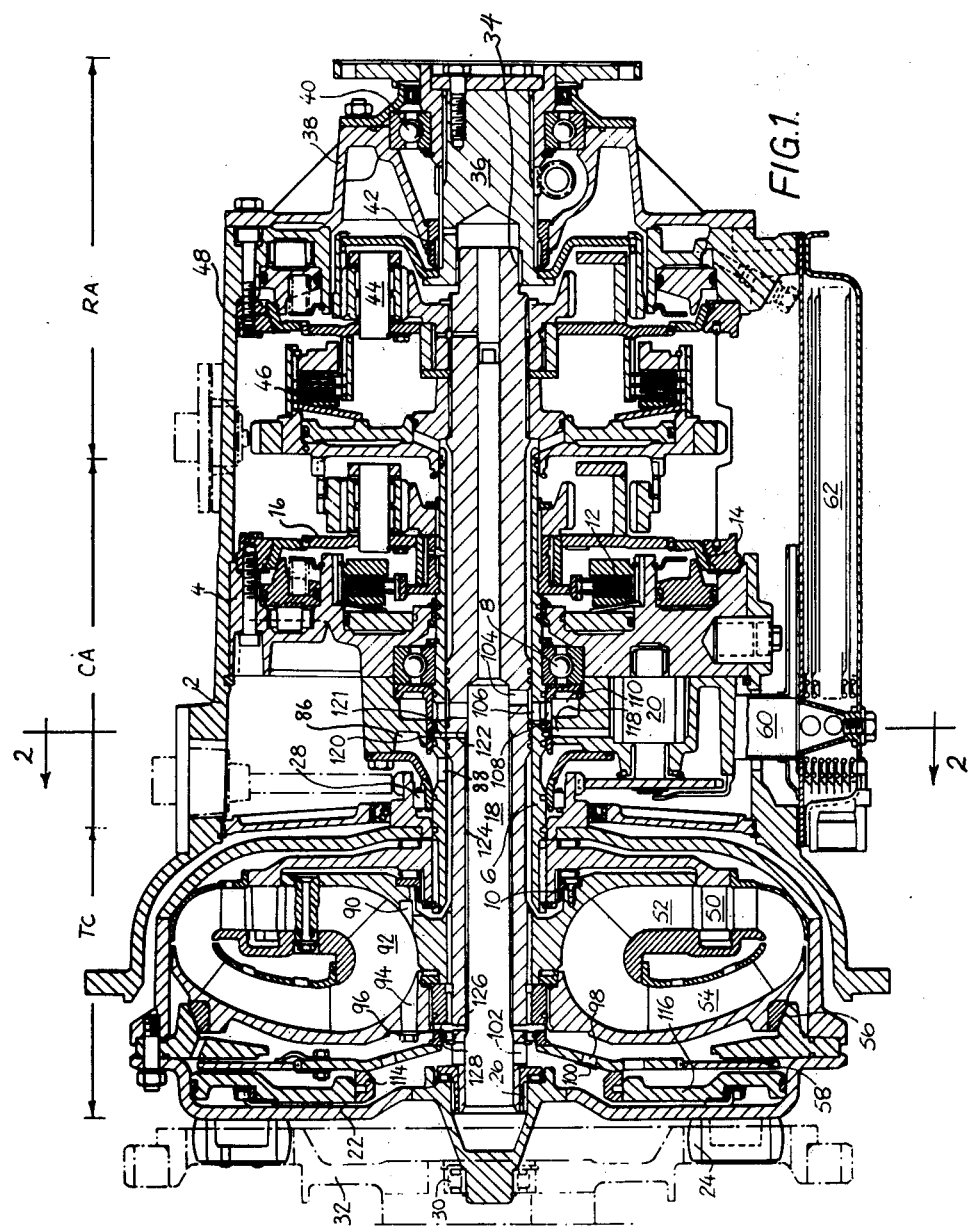
FIG. 1 is a longitudinal section of a hydrodynamic torque converter transmission, adapted to use the torque converter as a retarder, converting mechanical energy into heat, wherein the heat exchanger structure is shown only in highly schematic form.

The transmission of FIG. 1 may be regarded as an assembly of three main parts, namely, a torque converter TC of the type having a rotatable casing 22, a central assembly CA of operatively associated components and a rear assembly RA of operatively associated components.

The associated components of the central assembly CA are carried in a stationary member 4 which is mounted in a stationary housing 2 and through which the torque converter guide vane shaft 6 extends and is journalled in a bearing 8.

The central stationary member 4 also carries a guide vane shaft brake 12 and a planet gear carrier 16 for a planet gear interposed between the guide vane shaft 6 and a turbine shaft 18, and a brake 14 for the planet gear carrier 16.

A feeder fluid gear pump 20 comprises two externally meshing gears 21, 23 (FIG 2) of which one is driven through a gear on the rotatable casing 22 directly from a flywheel 32 through rubber cushions 24.

The turbine shaft 18 is journalled in the rotatable casing 22 through a plain bearing 26. The rotatable casing 22 is, at its rear end, journalled in the central stationary member 4 in a radial bearing 28 and at its front end in the flywheel 32 through a bearing 30. The turbine shaft 18 is, at its rear end, journalled through a plain bearing 34 in an output shaft 36 which, in turn, is journalled in a rear cover 38 by a ball bearing 40 and a radial bearing 42.

Between the turbine shaft 18 and the output shaft 36 there is a reverse planet gear arrangement having a planet gear carrier 44 giving a direct connection between the shafts 18 and 36 when a clutch 46 is engaged and reversing the direction of rotation of the shaft 36 when a brake 48 is engaged and the clutch 46 is released.

In the rotatable casing 22, a guide vane ring 50 is mounted on the guide vane shaft 6 and on the turbine shaft 18 a turbine member 52 is mounted. The rotatable casing 22 also contains a pump member 54, connectable or releasable from the rotatable casing through a clutch 56. A lock-up clutch arrangement 58 is also included for connecting the turbine shaft 18 directly to the rotatable casing 22.

Figure 2:
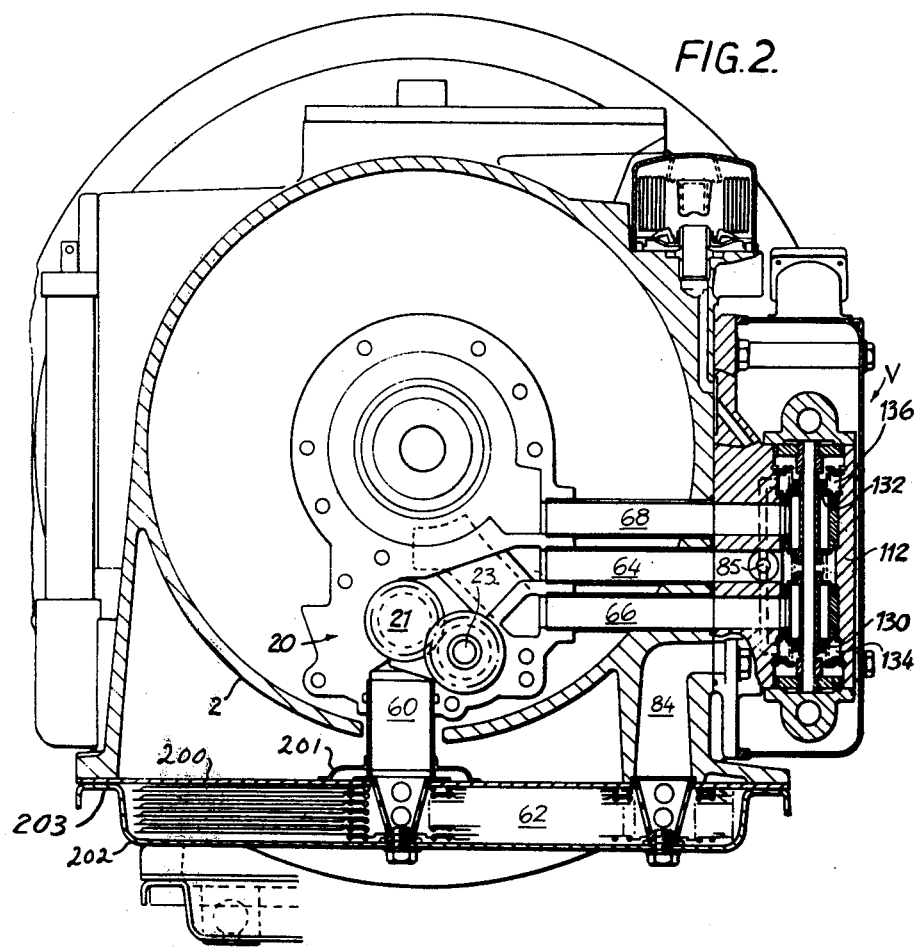
FIG. 2 is a cross-section of the transmission of FIG. 1 through its central assembly taken along line 2—2 of FIG. 1, wherein the heat exchanger structure is shown only in highly schematic form.

FIG. 2 shows a cross-section of the torque converter of FIG. 1 through the central assembly CA and together with FIG. 1 illustrates how the feeder fluid pump 20 delivers pressure fluid to a valve system V, mounted on the outside of the converter stationary housing 2, through a pressure fluid supply pipe 64 and two pipe connections 66 and 68, alternatively connectable by a valve 112 to the pressure fluid supply pipe 64, the remaining pipe of the pipes 66 and 68 returning the flow of fluid after its passage through the torque converter blade system. This figure also shows in the stationary housing 2 a return pipe 84 from the valve system to a heat exchanger 62 and a pipe connection 60 from the outlet side of the heat exchanger to the gear pump 20. A plate 200 forming one boundry of the heat exchanger 62 is attached to a stationary part of the torque converter, and an element 201 secures pipe 60 to 200. A cover plate 202 forms the outer boundry of the heat exchanger and includes a flange 203 for connection to plate 200. The path of fluid flow from the pipe 66 to the pipe 68 through the torque converter passes through the central assembly CA (FIG. 1) to a chamber 86, through holes 88, through spaces between the shafts 6 and 18 and through holes 90 to a working chamber 92 and the blade rings 50, 52 and 54, and thence through the holes 94 and associated maximum pressure valves 96, through a hole 98 and a one way valve 100, through a hole 102, through a central hole or bore 19 in the turbine shaft 19 and through the holes 104, 106 and 108 back to a chamber 110 in the central assembly CA, in which the pipe 66 is connected to the chamber 86 and the pipe 68 is connected to the chamber 110.

The flow of fluid passes along the path described when the torque converter is in hydraulic drive. The valve 112 is in a position in FIG. 2 to connect the pipe 64 to neither the pipe 66 or the pipe 68. In this condition, the pump member 54 is connected to the rotatable casing 22 by the clutch 56 through the force produced by the difference in fluid pressure across the maximum pressure valve 96. In direct drive the flow of fluid is principally reversed between the pipes 66 and 68 in such a way that pressure fluid enters through the pipe 68, the valve 112 being set to connect the pipe 64 to the pipe 68. However, instead of passing through the one way valve 100 the pressure fluid enters through the hole 102, proceeds through the maximum pressure valve 114 and, due to the pressure drop, it then acts on the servo piston 116, closing the brake 58. The fluid after passing through the maximum pressure valve 114 then passes between the braking surfaces of the clutch 56, releasing the pump member 54 and leaving the working chamber 92 through the hole 90, and thence back along the flow path described above to the pipe 66 and to the valve 112. In both cases the returned fluid passes through the valve 112 and back through the duct 84 in the main casing 2, to the heat exchanger, through the heat exchanger and back to the feeder fluid pump 20.

The cross-section shown in FIG. 2, passes through the longitudinal axis of the valve 112 which has, as described, the function of connecting the pressure oil pipe 64 to one or other of two pipes 66, 68 and to connect the one pipe not so connected to the pressure pipe through the duct 84.

The valve 112 also has a third position in which the pressure pipe 64 is connected neither to the pipe 66 nor the pipe 68. The pressure pipe 64 is then vented directly to the heat exchanger through a maximum pressure valve not shown. However, referring to FIG. 1, there is shown a channel 118 connecting the feeder fluid pump 20 through holes 120, 121 and 122, through a passage 124 formed in the turbine shaft, and other holes 126 and 128 also in the turbine shaft to the working chamber 92. The fluid entering through these holes and passages, being of a restricted quantity, will leave the working chamber 92 through the one way valve 100, which acts at the same time as a low pressure difference maximum pressure valve, passing through the pipe 68 and through a low pressure difference maximum pressure valve 132 (FIG. 2). A corresponding maximum pressure valve 130 is designed for a relatively high opening pressure to ensure that the fluid pressure in the working chamber 92 is suitable for hydraulic braking. This valve 130 will, when the transmission is in the neutral position, be closed. The spaces 134 and 136 in the valve 112 communicate with the pipe 84 in the stationary housing 2.

The valve 112 is constructed so that all parts, viz. valves, valve stems and valve seats are co-axially arranged, the valves being arranged for axial displacement to open, and when forced against their respective seats, they close.

Figure 3:
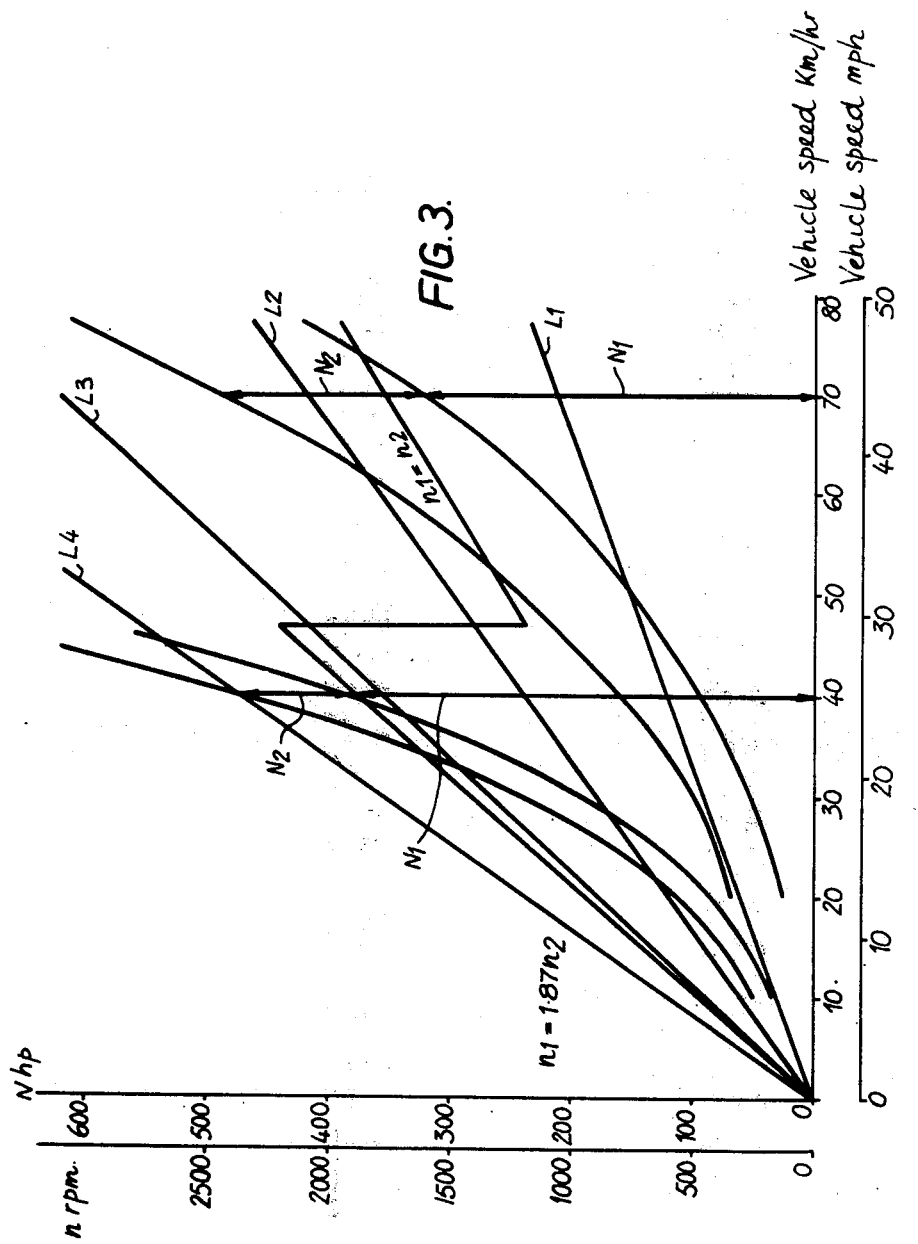
FIG. 3 is a graph showing diagrammatically as an example the braking torque obtainable by connecting hydraulic braking of a torque converter transmission of the type in question in a 40 ton truck having a 240 h.p. engine.

FIG. 3 illustrates graphically performance curves of a hydrodynamic torque converter transmission where the torque converter blade system is used as a retarder. The curves of FIG. 3 are for a 40 ton truck having a 240 h.p. engine at 2200 r.p.m. The straight lines L1, L2, L3 and L4 indicate the amount of energy developed down hills of gradients 2%, 4%, 6% and 8% respectively. In the figure, $N_1$ is the braking power resulting from hydraulic braking, engine braking and the rear axle; $N_2$ is the braking power resulting from rolling resistance and air resistance; $n_1$ is the engine speed in r.p.m.; and $n_2$ is the output shaft speed in r.p.m. Thus, when running down a gradient of 4% at a speed of 40 km/h, the heat removed by the torque converter must be at the rate of 240 hp., that is, the heat removed must be the same as the total energy of the engine driving the truck and this is represented by the intercept $N_1$. On the other hand, 20% of the cooling capacity is sufficient when hydraulic braking is not used.

Figure 4:
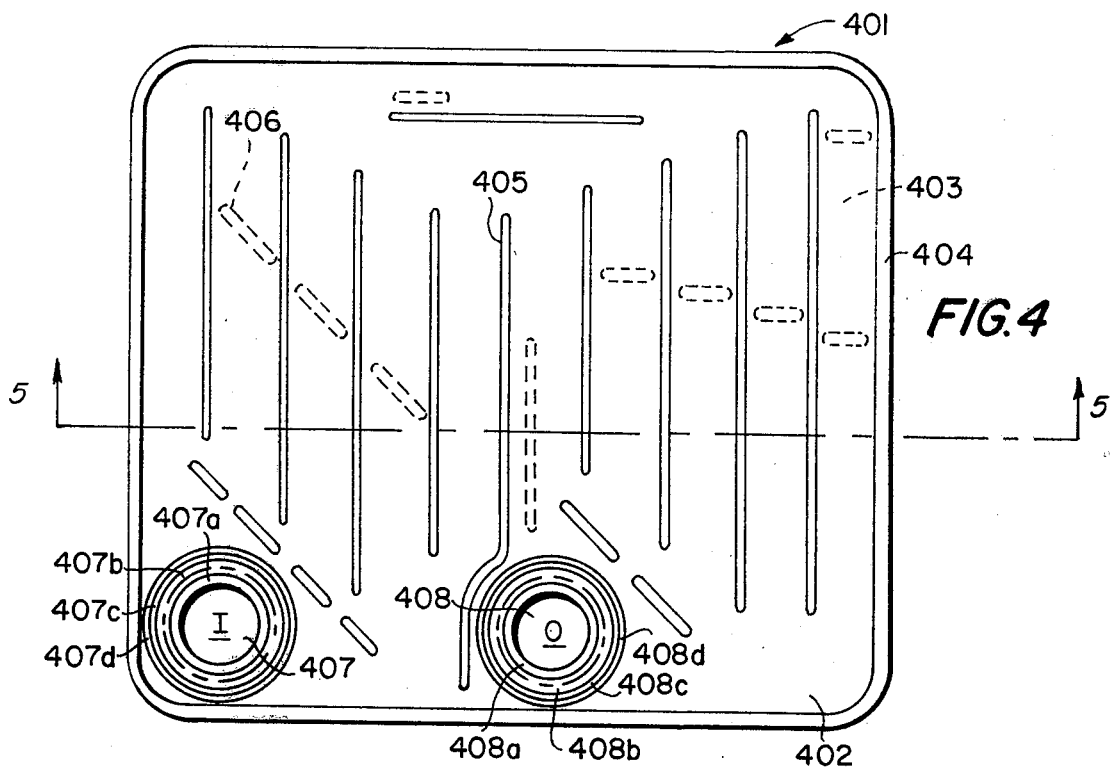
FIG. 4 is a plan of a heat exchanger cell, formed in accordance with the invention.
Figure 5:
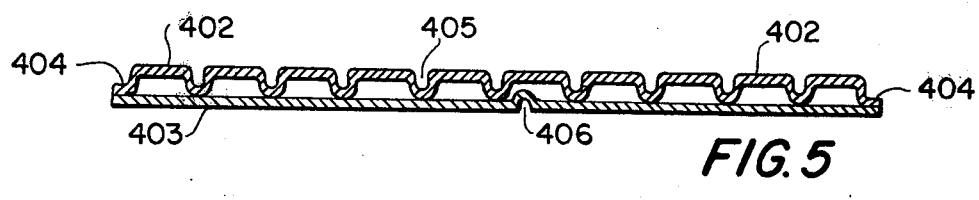
FIG. 5 is a section through the cell of FIG. 4, taken along line 5—5 of FIG. 4.

FIGS. 4 and 5 illustrate in plan view and cross-sectional view, respectively, an individual heat exchanger cell 401 formed in accordance with the present invention. The cell comprises an upper plate 402 and a lower plate 403, each of which plates are preferably stamped to the desired shape so that the two plates, as stamped with appropriate shapes, constitute the sole means for forming the fluid spaces within the interior of the cell, the flow directing or baffle means within the cell and the means for sealing the outer periphery of the cell. As is evident from the drawings, the cells are generally flat and a plane parallel to the upper and lower surfaces of the cell will be referred to hereinafter for convenience as the "main plane" of the cell. As is evident from the figures, the upper plate is bent downwardly about the outer periphery at which it joins the lower plate 403 to form an outwardly extending flange 404 whereat the plates are welded together around the outer periphery. Flow directing baffles are formed by downwardly extending projections 405 formed in the upper plate 402 andor upwardly extending depressions 406 formed in the lower plate 403. Wherever these depressions touch the other plate they may conveniently be welded thereto.

Also shown in FIG. 4 are inlet and outlet openings 407 and 408, respectively. For convenience these are also labeled "I" and "O", respectively. These openings pass completely through both of the plates 402 and 403 of the cell. Although the openings will be described in greater detail below, including two embodiments thereof, it will be convenient to identify in FIG. 4 the area surrounding the openings which include inner grooves 407a and 408a for receiving an inner sealing ring, a ridge 40b and 408b, a second outer groove 407c and 408c for receiving an outer sealing ring concentric with the inner sealing ring, and an outer ridge 407d and 408d for assisting in positioning the outer sealing ring. Since FIG. 4 illustrates the outer surface of the cell, the sealing rings referred to above will form a seal on the exterior of the cell, between that cell and the next adjacent cell.

Figure 6:
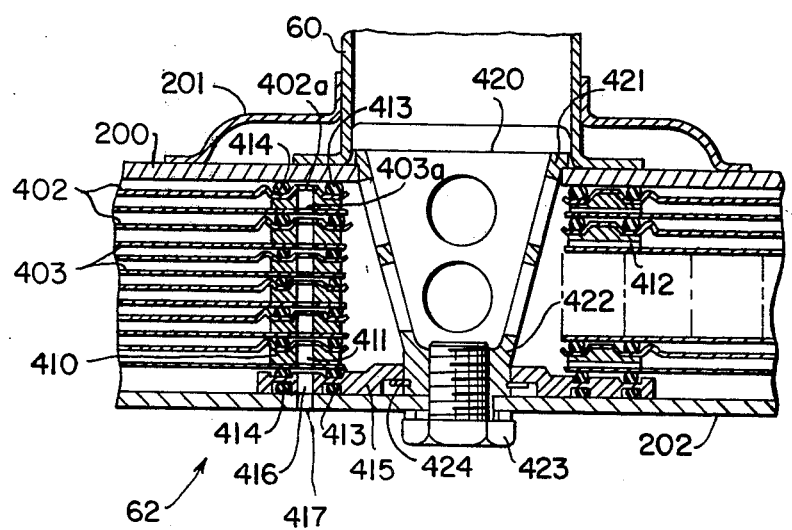
FIG. 6 is an enlarged cross-sectional view corresponding to a portion of FIG. 2.

FIGS. 6 and 7 illustrate one arrangement of the present invention in the vicinity of the openings of a stack of cells of the type shown in FIGS. 4 and 5. Although these figures illustrate the structure associated with the inlet openings 407, it will be understood that a similar structure is provided with respect to the outlet openings 408. Firstly, when the cells are stacked one upon the other, the openings form an elongated inlet passageway. Referring to FIG. 7, the portions 407a through 407d are more readily visible in the small portion of plate 402 shown therein. These are also visible in FIG. 6. Outside of each cell, i.e. between adjacent cells, above the upper cell and beneath the lower cell, there are provided a pair of concentric inner and outer sealing rings 413 and 414, respectively. As indicated above, these lie in grooves 407a and 407c of the structure of plate 402 surrounding opening 407. In practice, the sealing ring 413 prevents the oil within the passageway from passing across to the space exterior of the cells while the sealing ring 414 will prevent the cooling medium such as water or the like located exterior of the cells from passing into the oil passageway. In practice, however, there will be some leakage of oil past sealing ring 413 and of cooling medium past ring 414. The present invention provides a means for draining said leakage to atmosphere. Such means will be described below.

As illustrated in FIG. 6 and FIG. 7, within each cell and surrounding the opening 407 there is provided a spacing structure in the form of a ring shaped insert member 410. This member includes at least one and possibly more vertical leakage holes 411 which are arranged to communicate with an opening 402a located in the plate 402 and 403a located in the plate 403 to provide a leakage passageway for carrying leakage fluid from the space between rings 413 and 414 downwardly. As is evident from FIG. 6, this series of leakage openings forms with contiguous leakage openings a continuous path downwardly toward the exterior of the heat exchanger. Beneath the cells there is provided a bottom piece 415 which also includes suitable sealing rings 413 and 414, and which also includes an opening 416 for continuing the above noted leakage passageway to the opening 417 formed in the cover plate 202 and hence to atmosphere. The insert member 410 also includes a plurality of openings 412 which are not in communication with openings 411 but which extend across the member 410 for fluid communication between the illustrated passageway and the interior flow space of each cell. Obviously any number of holes 411 or 412 can be provided in accordance with desired operation.

The insert members 410 may preferably be welded to the respective plates 402 and 403. Also, the arrangement of the baffles 405 and 406 can be such as to control a pressure build-up within the cells. The ribs are also present to direct the flow of fluid within the cells and to obtain the required speed of flow within the cells to achieve a substantially equal flow distribution over the entire surface of the cells. The location and direction of the depressions 405 and 406 also enable the length and direction of the flow path through the cells to be adjusted as required. The depressions 405 and 406 also form mirror image ribs or grooves outside of the cells which form channels for the flow of cooling medium between the cells, thereby enhancing the flow conditions for the cooling medium such as water.

As noted above, an advantage of the present invention is that it is possible to easily gain access to the cells when mounted on a torque converter by simply removing the cover plate 202, after which cells can be removed and replaced. Such simplified handling is facilitated by a suitable mounting means including a tubular holding member 420 having a flange 421 which engages the plate 200. At its other end the member 420 includes a base 422 including a split ring 424 which acts upwardly against a bottom piece 415 urging the individual cells against each other. A bolt 423 in threaded engagement with base 422 tightens the tubular member in place.

FIGS. 8 and 9 illustrate another embodiment of the present invention. Considering the fact that the cells can be of any desired shape, the cells as illustrated in FIGS. 8 and 9, although of a slightly different shape, are essentially the same as those illustrated in FIGS. 6 and 7 with the exception of a modified spacing structure. In addition, FIG. 8 illustrates a different tubular holding member which will be described in greater detail below. In any event, this modified holding member can also be used with the embodiment of FIGS. 5 and 6.

Wherever the elements of FIGS. 8 and 9 correspond essentially to similar elements in FIGS. 6 and 7, the same numerals have been used, although raised by a prime mark. Also, while FIGS. 8 and 9 illustrate an inlet opening 407', it will be understood that the same structure can be applied to the outlet opening 408'.

One advantage of the present invention is that the cells may be formed solely by two stamped metal plates, the stamped shapes including all structure of the cells. In the embodiment of FIGS. 6 and 7, the plates were stamped to form the external boundries, the internal baffles and the structure surrounding the inlet and outlet openings. In the present embodiment, in addition thereto, the plates are stamped to form the shape of the structure for concurrently spacing the plates apart, permitting fluid flow therepast between the openings and the interiors of the cells and concurrently providing a leakage path out of communication with the interior of the cells. Referring to FIG. 9, the upper plate 402' is formed in a manner somewhat similar to the plate 402 except that the ridge 407b' may be somewhat more rounded in shape than the ridge 407b of FIG. 6. The bottom plate 403', however, is quite different in that the portion surrounding the opening 407' is stamped upwardly at selected portions to provide a spacing structure 440 having higher raised parts 441 and somewhat lower, although possibly still raised, parts 442. When the plates are assembled, the surfaces of raised portions 441 physically engage the ridge 407b' and are preferably welded thereto. Hence, referring to FIG. 9, the leakage space between rings 413' and 414'will pass downwardly through the opening 402a' and then directly through the opening 403a' which will be directly thereagainst. The series of such openings which provide the continuous leakage path are shown on the right-hand side of FIG. 8. As shown on the left-hand side of FIG. 9, the lower portions 442 of spacing structure 440 provide openings for fluid communication between the opening 407' and the interior space of the cell.

Although the invention has been described in considerable detail with respect to a preferred embodiment thereof, it will be apparent that the invention is capable of numerous modifications and variations apparent to those skilled in the art without departing from the spirit and scope of the invention.

I claim:
1. A heat exchanger comprising:
a plurality of generally flat cooling cells arranged in stacked relationship to each other,
each cell including a pair of plates of heat conducting material sealed together around their outer peripheries and forming between the plates a fluid flow space, each cell further including an inlet and an outlet opening, each of which openings pass completely through the cell in a direction perpendicular to the main plane of the generally flat cells and each said opening communicating with the said flow space within its respective cell,
said cells being stacked with their respective inlet openings in fluid communication with each other to form an inlet passage and with their respective outlet openings in communication with each other to form an outlet passage, and including sealing means encircling each of said inlet and outlet passages between each cell to block off the space outside of the cells from said passages, whereby a fluid flows into the inlet passage and through the inlet openings into the said flow spaces within the cells and through the outlet openings to the outlet passage while another fluid contacts the exterior surface of each cell, said cells being formed of only two plates which are shaped to form
   a. the sealed outer periphery of the cell, and
   b. a spacing structure surrounding at least one of the inlet and outlet openings and urging the two plates apart in the vicinity of the openings while concurrently providing openings therepast for communication between the openings and the interior flow space of the cell.

2. A heat exchanger according to claim 1, said spacing structure comprising raised portions on at least one of the plates engaging the other plate at selected locations.

3. A heat exchanger according to claim 2, said plates being stamped plates, and each spacing structure comprising a stamped shape which includes a raised portion which engages and is welded to the other plate and lower portions spaced from the other plate for fluid flow therepast.

4. A heat exchanger according to claim 1, said sealing means comprising a pair of concentric sealing rings, and said spacing structure located radially between the sealing rings.

5. A heat exchanger according to claim 4, said spacing structure comprising raised portions on at least one of the plates engaging the other plate at selected locations, and including a leakage opening passing completely through each spacing structure at the raised portions thereof, without communicating with the interior of the cells, whereby the spaces between the concentric rings communicate with the exterior of the heat exchanger.

6. A heat exchanger according to claim 5, said plates being stamped plates, and each spacing structure comprising a stamped shape which includes raised portions which engages and are welded to the other plate and lower portions spaced from the other plate for fluid flow therepast, and said leakage path extending through the weldment.

7. A heat exchanger according to claim 1, in combination with a torque converter, the oil within the working chamber of the torque converter being in communication with the inlet and outlet openings of the heat exchanger.

8. A heat exchanger according to claim 7, including a cover plate surrounding the heat exchanger, said cover plate being flanged for connection to a stationary casing of the torque converter.

9. A heat exchanger according to claim 1, wherein the cells are further sealed to each other at points within said outer periphery, and said further sealing points of the cell form a flow path within that cell.

10. A heat exchanger according to claim 1, said inlet and outlet openings being aligned with each other and including a tubular member located in at least one of the aligned inlet or outlet openings, said tubular member including means for securing the cells together.

11. A heat exchanger comprising:
   a plurality of generally flat cooling cells arranged in stacked relationship to each other,
   each cell including a pair of plates of heat conducting material sealed together around their outer peripheries and forming between the plates a fluid flow space, each cell further including an inlet and an outlet opening, each of which openings pass completely through the cell in a direction perpendicular to the main plane of the generally flat cells and each said opening communicating with the said flow space within its respective cell,
   said cells being stacked with their respective inlet openings in fluid communication with each other to form an inlet passage and with their respective outlet openings in communication with each other to form an outlet passage, and including sealing means encircling each of said inlet and outlet passages between each cell to block off the space outside of the cells from said passages, whereby a fluid flows into the inlet passage and through the inlet openings into the said flow spaces within the cells and through the outlet openings to the outlet passage while another fluid contacts the exterior surface of each cell,
   each of said sealing means comprising a pair of concentric rings defining therebetween a leakage space which separates the fluid within the heat exchange cells and the fluid outside of the cells,
   and means defining a leakage passageway from each leakage space completely through the cells adjacent thereto in a direction transverse to the main plane of the cells which passageway is out of communication with the interior of the flow space of the cells,
   whereby the succession of leakage spaces and leakage passageways provide a leakage path which communicates with the exterior of the heat exchanger for the passage of leaking fluid therealong.

12. A heat exchanger according to claim 11, including a spacing structure in each cell surrounding each of said openings and located radially between said sealing rings, said spacing structure including raised means for urging the two plates apart while concurrently providing openings therepast for communication between the respective openings and the interior flow space of the cell, and wherein the leakage path through each cell passes through the raised means of the spacing structure.

13. A heat exchanger according to claim 12, said spacing structure comprising a stamped shape on one of the plates which engages and is welded to the other plate of the cell at raised portions and includes lower portions over which fluid passes, said leakage path passing through a said weldment associated with a raised portion.

14. A heat exchanger according to claim 12, said spacing member comprising an insert located in each cell surrounding at least one opening thereof, said member including at least one first passageway therethrough parallel to the main plane of the cell for fluid communication between the opening and the interior of the cell, and at least one second passageway transverse to the main plane of the cells and communicating with openings through the plates to form therewith the said leakage passageway.

15. A heat exchanger according to claim 11, in combination with a torque converter, the oil within the working chamber of the torque converter being in communication with the inlet and outlet openings of the heat exchanger.

16. A heat exchanger according to claim 15, including a cover plate surrounding the heat exchanger, said cover plate being flanged for connection to a stationary casing of the torque converter.

17. A heat exchanger according to claim 11, wherein the cells are further sealed to each other at points within said outer periphery, and said further sealing points of the cell form a flow path within that cell.

18. A heat exchanger according to claim 11, said inlet and outlet openings being aligned with each other and including a tubular member located in at least one of the aligned inlet or outlet openings, said tubular member including means for securing the cells together.

19. A torque converter comprising a casing forming therein a working chamber having a pump part which includes at least one ring of pump blades and a turbine part having at least one ring of turbine blades,
   a fluid system within the torque converter for the flow of a working fluid to and through the torque converter, a pump means in the fluid system for circulating the working fluid through the system, and a heat exchanger means in the fluid system for cooling the working fluid,
   said heat exchanger comprising a stack of a plurality of individual generally flat essentially identical cooling cells, each cell including a pair of plates of heat conducting material sealed around the outer periphery of each cell to define an interior flow space and including a pair of openings extending completely through the cell in a direction generally transverse to the main plane of the generally flat cell, one being an inlet opening and one being an outlet opening, both openings communicating with the interior flow space of the cell,
   said cells being stacked with all inlet openings in communication with each other to form an inlet passage of the heat exchanger in fluid communication with the interior of a stationary part of the torque converter and all outlet openings being in communication with each other to form an outlet passage of the heat exchanger, and in fluid communication with the intake side of the said pump means, and including a sealing means encircling the inlet passage between each cell to block off the outside of the cells from the inlet passage, and a sealing means encircling the outlet passage between each cell to block off the space outside of the cells from the outlet passage,
   said cells of the stack being removably held against each other adjacent the exterior of a stationary portion of the torque converter casing, whereby the cells are accessible and exchangable so that the number and size of cells is easily changed on a given torque converter, and including a water tight cover plate removably attached to the stationary casing and covering the cells to form a casing for confining a second fluid which passes over the exterior of the cells.

20. A torque converter according to claim 19, said torque converter further including a guide part including a ring of guide blades.

21. A torque converter according to claim 19, wherein the working fluid is oil and the second fluid is water for cooling the oil.

22. A torque converter according to claim 19, said cells being formed of only two plates which are shaped to form the sealed outer periphery of the cells and a spacing structure surrounding at least one of the inlet and outlet openings and urging the two plates apart in the vicinity of the openings while concurrently providing openings therepast for communication between the openings and the interior of the flow space of the cells.

23. A torque converter according to claim 22, said spacing structure comprising raised portions on at least one of the plates engaging the other plate at selected locations.

24. A torque converter according to claim 19, each of said sealing means comprising a pair of concentric rings defining therebetween a leakage space which separates the fluids within the heat exchanger cells and the fluids outside of the cells, and means defining a leakage passageway from each leakage space completely through the cells adjacent thereto in a direction transverse to the main plane of the cells which passageway is out of communication with the interior of the flow space of the cells, whereby the succession of leakage spaces and leakage passageways provide a leakage path which communicates with the exterior of the heat exchanger for the passage of leaking fluid therealong.

25. A torque converter according to claim 24, including a spacing structure in each cell surrounding each of said openings and located radially between said sealing rings, said spacing structure including raised means for urging the two plates apart while concurrently providing openings therepast for communication between the respective openings and the interior flow space of the cell, and wherein the leakage path through each cell passes through the raised means of the spacing structure.

26. A torque converter according to claim 19, wherein the cells are further sealed to each other at points within said outer periphery, and said further sealing points of the cell form a flow path within that cell.

27. A torque converter according to claim 19, said inlet and outlet openings being aligned with each other and including a tubular member located in at least one of the aligned inlet or outlet openings, said tubular member including means for securing the cells together, and wherein the tubular member passes through the cover plate.

* * * * *